United States Patent Office 2,974,251
Patented Mar. 7, 1961

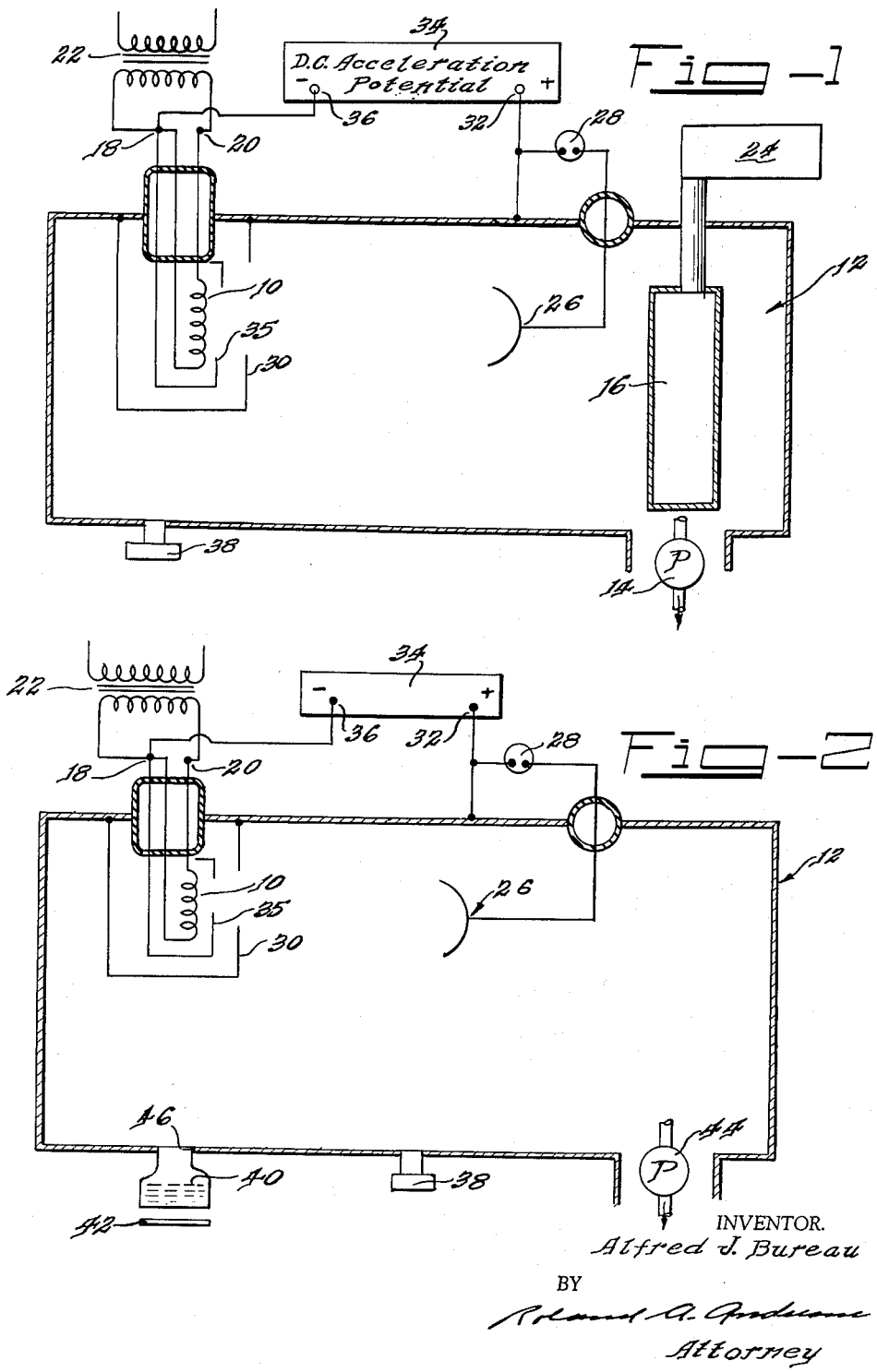

2,974,251

METHOD AND MEANS FOR INCREASING ELECTRON EMISSION

Alfred J. Bureau, Ames, Iowa, assignor to the United States of America as represented by the United States Atomic Energy Commission Filed Jan. 19, 1960, Ser. No. 3,467

5 Claims. (Cl. 313—345)

This invention relates to electron emitters and more specifically to thoriated-tungsten electron emitters.

It is well-known in the art that a small addition of thoria (thorium oxide) to tungsten wire will provide, with proper activation, a thoriated-tungsten emitter having an emission efficiency higher than that of pure tungsten.

Activation of the thoriated-tungsten emitter principally involves "flashing" the thoriated-tungsten emitter in a partial vacuum. In this process of "flashing," the temperature of the thoriated-tungsten emitter is raised to approximately the melting temperature of tungsten and is thought to result in a thin or monatomic layer of thorium being formed on the surface of the thoriated-tungsten emitter. Operation of the thoriated-tungsten emitter as such will continue until all of the free thorium has been driven out of and evaporated from the surface of the tungsten, at which time the emitter will operate as a pure tungsten emitter.

One use of the thoriated-tungsten emitter is found in a particle accelerating synchrotron where it is used to provide electron emission for an electron beam. The thoriated-tungsten wire, usually formed into a shaped emitter, is housed in a chamber having a partial vacuum being maintained by a vacuum pump. The thoriated-tungsten emitter is "flashed" to activate the emitter and is usually carbonized to stabilize the emission of the emitter. Emission of the thoriated-tungsten under pulsed conditions is approximately 250 microamperes for 70 to 100 watts of power applied to the emitter. During the "flashing" period, various dangers to the emitter present themselves. The high temperatures necessary for the "flashing" give rise to a high probability of burning out the emitter, and if a shaped emitter is used, warpage or distortion of the emitter may occur.

It is one object of this invention to provide a method and means for increasing emission from a thoriated-tungsten emitter for a given value of emitter power.

It is another object of this invention to provide a method and means for eliminating the "flashing" process necessary for activating the thoriated-tungsten emitter.

It is another object of this invention to provide a method and means for stabilizing the emission from the thoriated-tungsten emitter without carbonizing the emitter.

It is still another object of this invention to provide a method and means for increasing the emission life of the thoriated-tungsten emitter.

In general, this invention comprises the operation of a thoriated-tungsten emitter in the presence of a silicone compound vapor.

More complete understanding of the invention will best be obtained from consideration of the accompanying drawings in which:

Fig. 1 is a schematic view of the preferred embodiment of an apparatus for the present invention;

Fig. 2 is a schematic view of a second embodiment of an apparatus for the present invention.

Referring to the apparatus in Fig. 1, a thoriated-tungsten electron emitter 10 is housed in a chamber 12 having a partial vacuum maintained therein by a silicone oil diffusion vacuum pump 14 and an oil vapor trap 16. The oil vapor trap 16 is cooled by liquid air or a suitable refrigerant supplied by a refrigeration supply 24. Electrical power is supplied to the emitter 10 through terminals 18 and 20 of transformer 22. A positive potential is applied to a collecting electrode 26 through a microammeter 28 and to an accelerating electrode 30 from the positive terminal 32 of a D.C. potential supply 34. A negative potential is applied to a focusing electrode 35 and to the thoriated-tungsten emitter 10 through terminal 18 of transformer 22 from the negative terminal 36 of the D.C. potential supply 34. A vacuum gauge 38 records the pressure of the partial vacuum existing in the chamber 12.

Fig. 2 depicts the same basic apparatus as shown in Fig. 1 except that the chamber 12 has a partial vacuum maintained by a vacuum pump 44 not of the silicone oil diffusion type. Reservoir 40 containing silicone oil is attached to and has an opening 46 into the chamber 12. Reservoir 40 may be heated by heater 42. Components of the embodiment of Fig. 2 which correspond to components of the embodiments of Fig. 1 are given similar reference numbers and are therefore not further described herein.

In establishing emission of the thoriated-tungsten emitter 10 of Fig. 1, the silicone oil diffusion vacuum pump 14 is activated and chamber 12 evacuated. Liquid air or any other suitable refrigerant is injected into the oil vapor trap 16 from the refrigeration supply 24, thus allowing the trapping of volatile gases such as water and silicone oil vapors. When the evacuation of chamber 12 is established, the refrigeration supply 24 is removed and the oil vapor trap 16 allowed to warm, thus releasing the trapped vapors. The oil vapor trap 16 temporarily releases the vapors faster than the diffusion vacuum pump 14 removes them. Thus, the pressure within the chamber 12 rises, reaches a maximum value, and then begins to fall. When the pressure falls to approximately $4 \times 10^{-4}$ mm. of mercury, power is applied to the thoriated-tungsten emitter 10 and voltages are applied to electrodes 26, 30, and 35. The electron emission of the thoriated-tungsten emitter 10 increases and reaches a maximum for a given filament current. The silicone oil vapor is allowed to remain in the atmosphere of the evacuated chamber 12 for approximately 15 minutes after electron emission is initiated, after which refrigeration of the oil vapor trap is reestablished.

In establishing emission of the thoriated-tungsten emitter 10 in Fig. 2, the vacuum pump 44 is activated and chamber 12 evacuated. When the evacuation of chamber 12 is established, the reservoir 40 containing silicone oil is heated by heating means 42 forcing silicone oil vapors into the atmosphere of chamber 12. When the pressure within the chamber 12 rises due to the addition of the solicone vapors to $4 \times 10^{-4}$ mm. of mercury, power is applied to the thoriated-tungsten emitter 10 and voltages are applied to electrodes 26, 30, and 35. The electron emission of the thoriated-tungsten emitter 10 increases and reaches a maximum for a given filament current. The silicone oil vapor is allowed to remain in the atmosphere of the chamber 12 for approximately 15 minutes after electron emission is established, after which heating of the reservoir 40 by heating means 42 is discontinued.

When establishing the first emission of a new thoriated-tungsten emitter or emission after the vacuum of chamber 12 has been exposed to contaminated gases such as air, it is necessary for the chamber 12 to be evacuated for some time before introducing the silicone oil vapor. Subsequent establishment of emission is then accomplished by the methods hereinbefore described.

For a new thoriated-tungsten emitter, the first emission declines in a relatively short operating time due to the influence of contaminants. It is necessary, therefore, to reestablish emission several times before the influence of the contaminants is eliminated. The periods between reestablishment become longer with each repetition. In reestablishing the emission of a thoriated-tungsten emitter whose emission has dropped due to usage, power is removed from the emitter 10 and the voltages from the electrodes 26, 30, and 35. The methods hereinbefore described for the apparatus as shown in Figs. 1 and 2 are then followed.

Using 15 mil thoriated-tungsten wire containing 15% thorium in the methods for establishing emission in the apparatus shown in Figs. 1 and 2, emission, as recorded by microammeter 28, was found to be approximately 350 microamperes for an applied power to the emitter 10 of approximately 35 watts. For 15 mil thoriated-tungsten wire containing 15% of thorium operating in the apparatus of Figs. 1 and 2 without the addition of silicone vapor, emission being established by "flashing" the emitter 10 and carbonizing the emitter's surface, emission as recorded by microammeter 28 was found to be approximately 250 microamperes for an applied power to the emitter 10 of approximately 70–100 watts. In both cases, the spacing of the electrodes 26, 30, and 35 and the voltages applied to them were held constant. Although silicone oils have been used exclusively, it is believed that silicon compounds at least slightly volatile, including silicon compounds of higher volatility such as silicon hydride, may perform as well and be more convenient to use than silicone oil.

Persons skilled in the art will, of course, readily adapt the general teachings of the invention to embodiments other than the specific embodiments illustrated. Accordingly, the scope of the protection afforded the invention should not be limited to the particular embodiments shown in the drawings and methods described above, but shall be determined only in accordance with the appended claims.

What is claimed is:

1. In a thoriated-tungsten electron emitter operable in a chamber having evacuating means, the method of improving the operation of said thoriated-tungsten emitter comprising partially evacuating said chamber, introducing a silicone oil vapor into said partially evacuated chamber, establishing the emission of said thoriated-tungsten emitter when the partial vacuum pressure in said evacuated chamber is at about $4 \times 10^{-4}$ mm. of mercury, retaining said silicone oil vapor in the atmosphere of said partially evacuated chamber for a period of about 15 minutes, and then removing said silicone oil vapor from said atmosphere of said partially evacuated chamber.

2. In a thoriated-tungsten electron emitter operating in a partially evacuated chamber, the method of improving the operation of said thoriated-tungsten emitter comprising interrupting the emission of said thoriated-tungsten emitter, introducing a silicone oil vapor into said partially evacuated chamber, and restoring said emission.

3. In a thoriated-tungsten electron emitter operating in a partially evacuated chamber, the method of improving the operation of said thoriated-tungsten emitter comprising interrupting the emission of said thoriated-tungsten emitter, introducing a silicone oil vapor into said partially evacuated chamber, restoring said emission when the partial vacuum pressure in said evacuated chamber is at about $4 \times 10^{-4}$ mm. of mercury, retaining said silicone oil vapor in the atmosphere of said partially evacuated chamber for a period of about 15 minutes, and then removing said silicone oil vapor from said atmosphere of said partially evacuated chamber.

4. In a thoriated-tungsten electron emitter operating in a partially evacuated chamber having a partial vacuum maintained by a silicone oil diffusion vacuum pump and an oil vapor trap, the method of improving the operation of said thoriated-tungsten emitter comprising interrupting the emission of said thoriated-tungsten emitter, releasing the silicone oil vapors from said oil vapor trap, restoring said emission when the partial vacuum in said evacuated chamber is at a pressure of about $4 \times 10^{-4}$ mm. of mercury, and restoring said oil vapor trap to operation about 15 minutes after the restoration of said emission.

5. In a thoriated-tungsten electron emitter operable in a partially evacuated chamber, the method of improving the operation of said thoriated-tungsten emitter comprising introducing a silicone oil vapor into said partially evacuated chamber, establishing the emission of said thoriated-tungsten emitter in the presence of said silicone oil vapor, and removing said silicone oil vapor from the atmosphere of said partially evacuated chamber after a period of time.

References Cited in the file of this patent

UNITED STATES PATENTS

| | | |
|---|---|---|
| 2,456,761 | Williams | Dec. 21, 1948 |
| 2,570,124 | Hernqvist | Oct. 2, 1951 |
| 2,813,995 | Watts | Nov. 19, 1957 |